(12) United States Patent
Nagaswamy et al.

(10) Patent No.: US 11,347,557 B2
(45) Date of Patent: May 31, 2022

(54) METHOD AND SYSTEM FOR PREDICTING OPTIMAL NUMBER OF THREADS FOR APPLICATION RUNNING ON ELECTRONIC DEVICE

(71) Applicant: Samsung Electronics Co., Ltd, Suwon-si (KR)

(72) Inventors: Sriram Nagaswamy, Bangalore (IN); Suhas Shantaraja Palasamudram, Bangalore (IN); Karthikeyan Somanathan, Bangalore (IN); Sandeep Palakkal, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 225 days.

(21) Appl. No.: 16/225,595

(22) Filed: Dec. 19, 2018

(65) Prior Publication Data

US 2019/0196874 A1 Jun. 27, 2019

(30) Foreign Application Priority Data

Dec. 26, 2017 (IN) .............................. 201741046612

(51) Int. Cl.
*G06F 9/50* (2006.01)
*G06F 9/445* (2018.01)
(Continued)

(52) U.S. Cl.
CPC .......... *G06F 9/505* (2013.01); *G06F 9/44505* (2013.01); *G06F 9/44578* (2013.01);
(Continued)

(58) Field of Classification Search
CPC .... G06F 9/505; G06F 9/4893; G06F 9/44578; G06F 9/44505; G06N 7/00; G06N 5/003; G06N 20/10; G06N 5/048
See application file for complete search history.

(56) References Cited

U.S. PATENT DOCUMENTS 6,182,109 B1 * 1/2001 Sharma ................. G06F 9/5027
709/203
6,247,121 B1 * 6/2001 Akkary ................. G06F 9/3838
712/239

(Continued)

FOREIGN PATENT DOCUMENTS

WO  2011025720 A1  3/2011

OTHER PUBLICATIONS

Wintwer et al ;Scalable Thread Scheduling and Global Power Management for Heterogeneous Many-Core Architectures; Sep. 11-15, 2010 (Year: 2010).*

(Continued)

*Primary Examiner* — Wei Y Zhen
*Assistant Examiner* — Brahim Bourzik

(57) ABSTRACT

Accordingly embodiments herein disclose a method for predicting optimal number of thread for an application in an electronic device. The method includes receiving, by an application thread controller, a request to predict a number of threads to be spawned from the application in real-time. Further, the method includes measuring, by the application thread controller, a current state of the electronic device based on the request received from the application. Further, the method includes predicting, by the application thread controller, the optimal number of threads to be spawned for the application based on a scheduler-behaviour model and the current state of the electronic device. Further, the method includes recommending, by the application thread controller, the number of threads to be spawned by the application based on the prediction.

20 Claims, 12 Drawing Sheets

(51) Int. Cl.
*G06N 7/00* (2006.01)
*G06N 5/00* (2006.01)
*G06F 9/48* (2006.01)
*G06N 3/08* (2006.01)
*G06N 20/10* (2019.01)

(52) U.S. Cl.
CPC ............. *G06F 9/4893* (2013.01); *G06N 7/00* (2013.01); *G06N 3/08* (2013.01); *G06N 5/003* (2013.01); *G06N 20/10* (2019.01)

(56) References Cited

U.S. PATENT DOCUMENTS

| | | | |
|---|---|---|---|
| 6,477,561 B1 | 11/2002 | Robsman | |
| 7,363,369 B2* | 4/2008 | Banerjee | G06F 9/5027 709/224 |
| 8,413,151 B1* | 4/2013 | Stratton | G06F 9/4843 718/102 |
| 9,594,599 B1* | 3/2017 | Johnson | G06F 9/5083 |
| 10,146,583 B2* | 12/2018 | Kang | G06F 9/5066 |
| 2002/0046230 A1* | 4/2002 | Dieterich | G06F 9/4843 718/107 |
| 2004/0194093 A1* | 9/2004 | Koutharapu | G06F 9/505 718/100 |
| 2006/0107261 A1 | 5/2006 | Vedula | |
| 2010/0146513 A1* | 6/2010 | Song | G06F 1/329 718/104 |
| 2011/0067029 A1* | 3/2011 | Wolfe | G06F 9/505 712/228 |
| 2011/0187712 A1* | 8/2011 | Yoon | G06T 13/40 345/420 |
| 2012/0151494 A1* | 6/2012 | Raspl | G06F 9/5083 718/105 |
| 2013/0080761 A1* | 3/2013 | Garrett | G06F 11/3414 713/100 |
| 2014/0282588 A1* | 9/2014 | Suzuki | G06F 9/5044 718/104 |
| 2014/0373020 A1* | 12/2014 | Govindarajeswaran | G06F 9/505 718/102 |
| 2016/0253217 A1 | 9/2016 | Shows | |
| 2016/0335125 A1* | 11/2016 | Lee | G06F 9/4881 |
| 2020/0125400 A1* | 4/2020 | Venkataraman | G06F 9/4881 |

OTHER PUBLICATIONS

ISA/KR, "International Search Report and Written Opinion of the International Searching Authority," International Application No. PCT/KR2018/015775, dated Mar. 12, 2019, 8 pages.

Supplementary European Search Report in connection with European Application No. 18894561.2 dated Sep. 1, 2020, 10 pages.

Tarvo, et al., "Automatic performance prediction of multithreaded programs: a simulation approach," Autom Softw Eng (2018) 25, 55 pages.

* cited by examiner

METHOD AND SYSTEM FOR PREDICTING OPTIMAL NUMBER OF THREADS FOR APPLICATION RUNNING ON ELECTRONIC DEVICE

CROSS-REFERENCE TO RELATED APPLICATION

This application is based on and claims priority under 35 U.S.C. 119 to Indian Patent Application No. 201741046612 filed on Dec. 26, 2017 in the Indian Patent Office, the disclosure of which is incorporated by reference herein in its entirety.

BACKGROUND

1. Field

The present disclosure relates to an application thread management, and more specifically related to a method and system for predicting optimal number of threads for an application running on an electronic device.

2. Description of Related Art

In an electronic device, a developer generally sets a fixed number of threads for an application. Each thread is executed by a single core (e.g., CPU), which has its own thread queue, allocated memory on a Random Access Memory (RAM). Processing cores are assigned to the threads by a scheduler. A single core may be assigned to multiple threads which get executed sequentially, for example, when number of active cores available is less than the number of threads application requests. An execution time for the threads depends on system conditions (e.g., current length of thread queue of assigned core, a status of main memory, how many processors are currently active, or the like). The fixed number of threads is non-optimal for all conditions to run the application in the electronic device.

SUMMARY

The principal object of the embodiments herein is to provide a method and system for predicting optimal number of threads for an application in an electronic device.

Another object of the embodiment herein is to receive a request to predict a number of threads to be spawned from the application in a real-time.

Another object of the embodiment herein is to determine a run-time for a plurality of scheduler-behaviour configurations for the current state of the electronic device.

Another object of the embodiment herein is to select the scheduler-behaviour configuration from the plurality of scheduler-behaviour configurations, where the selected scheduler-behaviour configuration results in minimum run-time of the application for the current state of the electronic device.

Another object of the embodiment herein is to predict the number of threads to be spawned for the application based on a scheduler-behaviour model and the current state of the electronic device.

Another object of the embodiment herein is to predict the number of threads to be spawned for the application by selecting a thread count corresponding to the scheduler-behaviour configuration that takes the minimum run-time for the current state of the electronic device.

Another object of the embodiment herein is to dynamically learn the plurality of scheduler-behaviour configurations by an application thread controller for various states of the electronic device.

Another object of the embodiment herein is to spawn the number of threads for the application.

Accordingly embodiments herein disclose a method for predicting optimal number of threads for an application in an electronic device. The method includes receiving, by an application thread controller, a request to predict a number of threads to be spawned from the application in real-time. Further, the method includes measuring, by the application thread controller, a current state of the electronic device in response to the request received from the application. Further, the method includes predicting, by the application thread controller, the number of threads to be spawned for the application based on a scheduler-behaviour model and the current state of the electronic device. Further, the method includes recommending, by the application thread controller, the number of threads to be spawned by the application based on the prediction.

In an embodiment, the current state of the electronic device includes, but not limited to, a current Central Processing Unit (CPU) load, the current Random-Access Memory (RAM) usage, a current temperature, a current memory status, a number of active cores in the electronic device, and a current battery condition and the number of threads requested by the application.

In an embodiment, the current state of the electronic device is dynamically determined while the electronic device running a background task.

In an embodiment, the current state of the electronic device is dynamically determined while the electronic device running a foreground task.

In an embodiment, the current state of the electronic device is dynamically determined without executing any application.

In an embodiment, the scheduler-behaviour model includes a plurality of scheduler-behaviour configurations corresponding to one or more device states, a run-time of the application corresponding to the plurality of scheduler-behavior configurations, and a thread count spawned corresponding to the plurality of scheduler-behavior configurations.

In an embodiment, predicting by the application thread controller the number of threads to be spawned for the application based on the scheduler-behaviour model and the current state of the electronic device comprises identifying a plurality of scheduler-behaviour configurations for the current state of the electronic device, selecting a scheduler-behaviour configuration from the plurality of scheduler-behaviour configurations, and predicting the number of threads to be spawned for the application by selecting a thread count corresponding to the selected scheduler-behaviour configuration. The selected scheduler-behaviour configuration results in minimum run-time for the current state of the electronic device In an embodiment, the plurality of scheduler-behaviour configurations are dynamically learned by the application thread controller for various states of the electronic device.

Accordingly embodiments herein disclose an electronic device for predicting the optimal number of threads for an application. The electronic device includes a memory comprising the application, and a processor. An application thread controller is communicated to the memory and the processor. The application thread controller is configured to receive a request to predict a number of threads to be spawned from the application in real-time. The application thread controller is configured to measure a current state of the electronic device in response to the request received from the application. The application thread controller is configured to predict the number of threads to be spawned for the application based on a scheduler-behaviour model and the current state of the electronic device. The application thread controller is configured to recommend number of threads to be spawned by the application based on the prediction.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
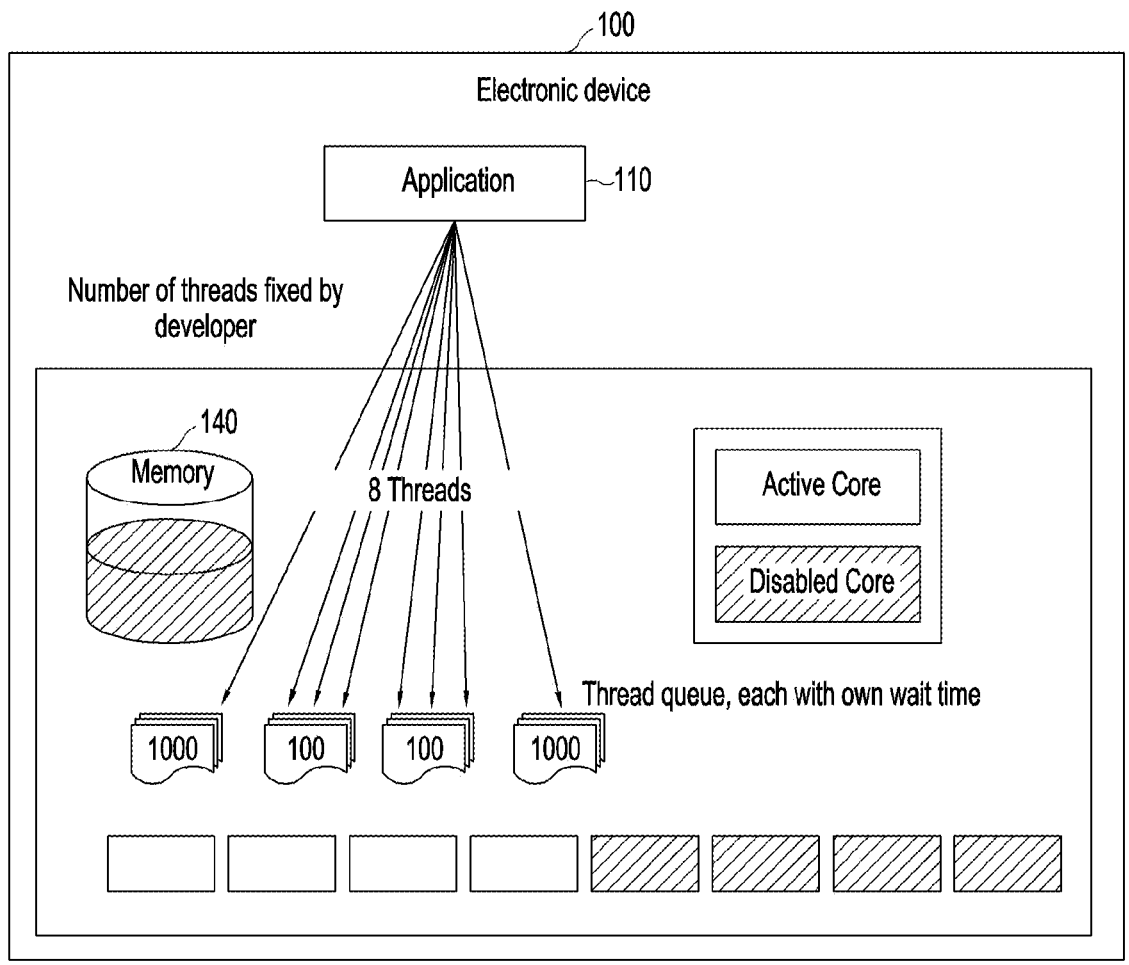
FIG. 1 illustrates an example in which an electronic device controls spawning of threads for an application, according to prior art.

FIGS. 1 through 11B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hard-wired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of this disclosure. Likewise, the blocks of the embodiments may be physically combined into more complex blocks without departing from the scope of this disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

FIG. 1 illustrates an example in which the electronic device 100 controls spawning of threads for the application 110, according to prior art. Consider a scenario, where the application 110 requests 8 threads to execute a program, when only 4 cores are active in a processor. As the number of active cores is less than the requested threads, it is non-optimal for running the application 110 in the electronic device 100, it may result in making some of the threads wait for the cores to be available for processing. This might lead to a thread creation overhead in the electronic device 100. Further, if the application 110 is memory intensive and a memory 120 (e.g., RAM or the like) is full then, the threads request more memory to execute the application. This results in a time-delay for executing the application. Furthermore, the electronic device 100 does not optimally utilize the system resources so as to provide unreliable/poor user experience.

Thus, it is desired to address the above mentioned disadvantages and shortcomings, and provide a useful alternative.

Accordingly embodiments herein achieve an electronic device for predicting the optimal number of threads for an application. The electronic device includes a memory comprising the application, and a processor. An application thread controller is communicated to the memory and the processor. The application thread controller is configured to receive a request to predict a number of threads to be spawned from the application in real-time. The application thread controller is configured to measure a current state of the electronic device in response to the request received from the application. The application thread controller is configured to predict the number of threads to be spawned for the application based on a scheduler-behaviour model and the current state of the electronic device. The application thread controller is configured to recommend the number of threads to be spawned by the application based on the prediction.

Unlike to conventional methods and systems, the proposed method can be used to predict the current optimal number of threads in real time based on the scheduler-behaviour model and the current state of the electronic device indicates parameters such as a current CPU load, a current RAM usage, a current temperature, a current memory status, a number of active cores in the electronic device, and a current battery condition. This results in faster execution time in the electronic device. Hence, the electronic device improves the user experience.

The proposed method can be used to predict current optimal number of threads in real time based on the current state of the electronic device and the scheduler-behaviour configuration. This results in quickly launching the application in a smooth manner immediately after restarting the electronic device and the electronic device executes many background tasks.

In an example, when the application starts running on an embedded platform of the electronic device already running multiple background tasks, the electronic device samples the system parameters at that instant and the application utilizes the current state of the electronic device to predict the ideal number of threads for the application in that instant. This will result in the best performance of the application at that instant.

The method can be used to maintain the real time performance of the electronic device and improves the user experience by varying thread allocation according to system conditions in an automatic manner. The method can be used to dynamically determine the number of thread resources for the particular system condition and enhances optimum performance for a developer in an automatic manner.

Referring now to the drawings, and more particularly to FIGS. 2 through 11, there are shown preferred embodiments.

Figure 2:
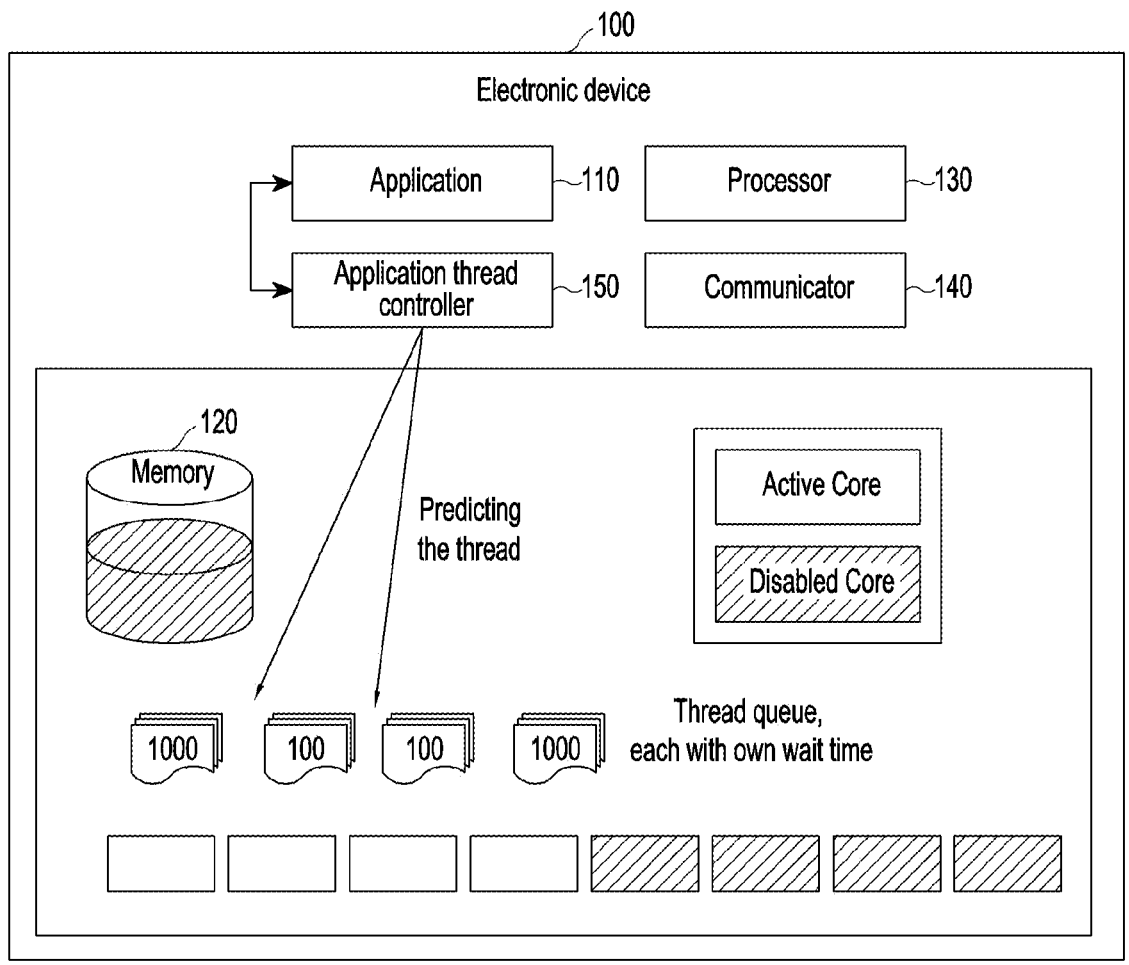
FIG. 2 illustrates an overview of an electronic device for controlling spawning of threads for the application, according to an embodiment as disclosed herein.

FIG. 2 illustrates an overview an electronic device 100 for controlling spawning of threads for an application 110, according to an embodiment as disclosed herein. The electronic device 100 can be, for example, but not limited to a smart phone, a Personal Digital Assistant (PDA), a tablet computer, a laptop computer, a personal media player device, a wireless web-watch device, a personal headset device, an application specific device, or the like. The application can be, for example, but not limited to a social networking application, a web application, a native application, an email application, a call application, a messaging application, a game application, a multimedia application, a video application or the like.

In an embodiment, the electronic device 100 includes the application 110, a memory 120, a processor 130, a communicator 140 and an application thread controller 150. The application thread controller 150 is communicated to the memory 120, the processor 130, and the communicator 140.

In an embodiment, the application thread controller 150 is configured to receive a request to predict a number of threads to be spawned from the application 110 in real-time. In general, each task usually includes one or more execution abstractions known as "threads." The thread typically includes its own instruction pointer and sometimes has its own stack. Typically, access to a CPU is scheduled per-thread. The task is thus an environment in which one or several threads are scheduled independently to run on the CPU(s), and not necessarily all (or even more than one) at a time even in multi-processor architectures.

In an embodiment, the request may be implemented in a variety of forms including system calls, register settings or the like.

Further, the application thread controller 150 is configured to measure a current state of the electronic device 100 based on the request received from the application 110. In an embodiment, the current state of the electronic device 100 includes but not limited to, a current CPU load, a current RAM usage, a current temperature, a current memory status, a number of active cores in the electronic device 100, a workload within the thread, and a current battery condition.

In an embodiment, the current state of the electronic device 100 is dynamically determined when the electronic device 100 is in an idle state, or while the application 110 associated with electronic device 100 runs as a background task or a foreground task.

Based on the current state of the electronic device 100 and a scheduler-behaviour model, the application thread controller 150 is configured to predict the number of threads to be spawned for the application 110.

In an embodiment, the scheduler-behaviour model includes a plurality of scheduler-behaviour configurations corresponding to one or more device states, a run-time of the application 110 corresponding to the plurality of scheduler-behavior configurations, and a thread count spawned corresponding to the plurality of scheduler-behavior configurations.

In an embodiment, the application thread controller is configured to predict the number of threads to be spawned for the application based on a Machine Learning (ML) model. The ML Model can be developed based on at least one of a regression model, classification model, Support Vector Machine (SVM) model, neural network approaches or any other ML approaches. The ML model is trained from a system data (e.g., current CPU load, current RAM usage, current temperature, current memory status, number of active cores in the electronic device 100, current battery condition or the like) collected from the electronic device 100 over the period of time.

In an embodiment, multiple regression models predict the running time, each for a given number of thread, of the application 110 using the current measured system parameters. The model that predicts the minimum running time is chosen and the corresponding number of threads is predicted as the optimal one.

In an example, using a training data, 'K' regression models are trained to predict a running time from the system parameters at once. During the run-time, on the electronic device 100, each regression model predicts the current running time. Further, regression model that predicts the lowest running time is chosen and the corresponding number of threads is selected as the optimal number of threads for the specific application.

In an embodiment, the classification model classifies the current system parameters measured into a class belonging to the optimal number of threads. In this case, each output class corresponds to a number of threads.

In an embodiment, the application thread controller 150 is configured to train the ML model (consider model type 1) for different system conditions to predict the time taken for a given system condition and the thread count. This results in multiple models (one for each thread count). During an inferencing procedure, the ML model that predicts the minimum run time for the current system condition is selected and the corresponding thread count is treated as the optimal. That is, $k_{optimal}=\text{ArgMin}_k T_k(\text{system parameters})$, where k is thread count, $T_k(\ )$ gives predicted time from $k^{th}$ model.

In another embodiment, after creating run-time prediction models (i.e., model type 1) for every possible thread count, the application thread controller 150 utilizes the models (i.e., model type 1) to label the training data (e.g., system conditions) itself, where the label now is optimal thread count, predicted by models trained by the model type 1. Further, application thread controller 150 trains a classifier model to classify the training data (e.g., system condition parameters) into classes, where the class label is optimal thread number. This results in a single classifier model.

In an example, an optimal thread prediction is determined as a classification problem, where a unique class id is assigned to each number of threads under consideration. Using the training set, a classification model (e.g., neural network or the like) is trained to classify the measured system condition parameters into one of the classes at once. During the run-time, the classification model predicts the class from the current system parameters. The optimal number of threads is the one corresponding to the class predicted by the classification model.

In an embodiment, the application thread controller 150 is configured to identify a plurality of scheduler-behaviour configurations for the current state of the electronic device 100. Further, the application thread controller 150 is configured to select a scheduler-behaviour configuration from the plurality of scheduler-behaviour configurations. The scheduler-behaviour configuration provides a minimum run-time for the current state of the electronic device 100. Further, the application thread controller 150 is configured to predict the number of threads to be spawned for the application 110 by selecting the thread count corresponding to the selected scheduler-behaviour configuration.

In an embodiment, the scheduler-behaviour configuration indicates at least one of a state of the electronic device 100, a time taken by the application 110 at the state of the electronic device 100, and the thread count spawned at the state of the electronic device 100.

In an embodiment, the scheduler-behaviour configuration may include information associated with an allocation of the memory 120 and/or CPU resources to predict the number of threads to be spawned for the application 110.

In an embodiment, the scheduler-behaviour configuration may include information about a memory configuration data and a thread configuration data. A particular value and/or setting for the memory configuration data and the thread configuration data may correspond to a particular respective memory buffer and the CPU thread configuration setting for the application 110. The memory configuration data may correspond to a quantity, size of memory resources and how much of memory 120 is free currently. The thread configuration data may correspond to a quantity of CPU threads, a running time of threads and/or thread prioritization. It should be understood that other types of resources and/or resource attributes may be correspondingly set/allocated for the application 110 to improve the performance.

In an embodiment, the plurality of scheduler-behaviour configurations are dynamically learned by the application thread controller 150 for various states of the electronic device 100.

In an example, the application thread controller 150 can be used to predict the number of threads to be spawned for the application 110 based on the number of threads used and complexity of the thread represented by measure such as cycles required or a length of time the threads run.

In an embodiment, the application thread controller 150 may provide a thread management section that effectively predicts the number of threads to be spawned for the application 110 based on the scheduler-behaviour configuration and the current state of the electronic device 100. After predicting the number of threads to be spawned for the application, the application thread controller 150 is configured to suggest the optimum number of threads for the application 110, such that the application 110 has to spawn the threads.

Further, the application thread controller 150 can be used to provide a bridge between the application 110 and a scheduler executed in an Operating System (OS) (not shown) for improving the performance of the electronic device 100. The OS is capable of allocating multiple processing threads among resources of the cores according to a scheduling system. As is generally understood in the art, the threads represent portions of application programs (e.g. sets of instructions) that may be substantially scheduled separately and executed independently on the different core.

Further, the OS controls the execution of the application 110 and computer programs, and provides scheduling, input-output control, file and data management, memory management, and communication control and related services in the electronic device 100.

In an embodiment, the application thread controller 150 may include a thread allocating logic that may be arranged to monitor real time computing data and allocate the thread to the at least one application 110 based, at least in part, on the monitored real time computing data, the current CPU load, the current RAM usage, the current temperature, the current memory status, the number of active cores in the electronic device 100, and the current battery condition.

In an embodiment, the application thread controller 150 may include the thread allocating logic may include a thread allocation data that may be useful for allocating the thread to an appropriate application based on learned information about the plurality of scheduler-behaviour configurations.

In an embodiment, the application thread controller 150 may include the thread allocating logic may include a thread allocation data that may be useful for allocating the thread to an appropriate application based on learned information about the plurality of scheduler-behaviour configurations.

In an embodiment, the application thread controller 150 may include a thread allocating logic that may be arranged to monitor real time computing data and allocate the thread to the at least one application 110 based, at least in part, on the monitored real time computing data, the current CPU load, the current RAM usage, the current temperature, the current memory status, the number of active cores in the electronic device 100, and the current battery condition.

Further, the electronic device 100 may provide for multiple processing cores, for example, each containing a processing unit for executing arithmetic, logical, and dataflow instructions, registers, caches and the like. Further, the processing cores may communicate with the memory 120 logically shown as a single entity but typically comprised of various memory devices including random access memory, disk drive, flash drive, and the like.

The memory 120 may hold an OS program (not shown) of the type generally known in the art as well as multiple application programs whose execution will be managed by the operating system program.

The processor 130 is configured to execute instructions stored in the memory 120 and to perform various processes. The communicator 140 is configured for communicating internally between internal hardware components and with external devices via one or more networks. The communicator 140 is configured for communicating with the application thread controller 150 to control spawning of threads for the application 110 embedded in the electronic device 100.

The processor 130 serves to execute instructions for the application 110 that may be loaded into the memory 120. The processor 130 may be a set of one or more processors or may be a multi-processor core, depending on the implementation. Further, the processor 130 may be implemented using one or more heterogeneous processor systems in which a main processor is present with secondary processors on a single chip. As another illustrative example, the processor 130 may be a symmetric multi-processor system containing multiple processors of the same type.

The memory 120 also stores instructions to be executed by the processor 130. The memory 120 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 120 may, in some examples, be considered a non-transitory storage medium. The term "non-transitory" may indicate that the storage medium is not embodied in a carrier wave or a propagated signal. However, the term "non-transitory" should not be interpreted that the memory 120 is non-movable. In some examples, the memory 120 can be configured to store larger amounts of information than the memory. In certain examples, a non-transitory storage medium may store data that can, over time, change (e.g., in Random Access Memory (RAM) or cache).

Although the FIG. 2 shows various hardware components of the electronic device 100 but it is to be understood that other embodiments are not limited thereon. In other embodiments, the electronic device 100 may include less or more number of components. Further, the labels or names of the components are used only for illustrative purpose and does not limit the scope of this disclosure. One or more components can be combined together to perform same or substantially similar function to control spawning of the threads for the application embedded in the electronic device 100.

Figure 3:
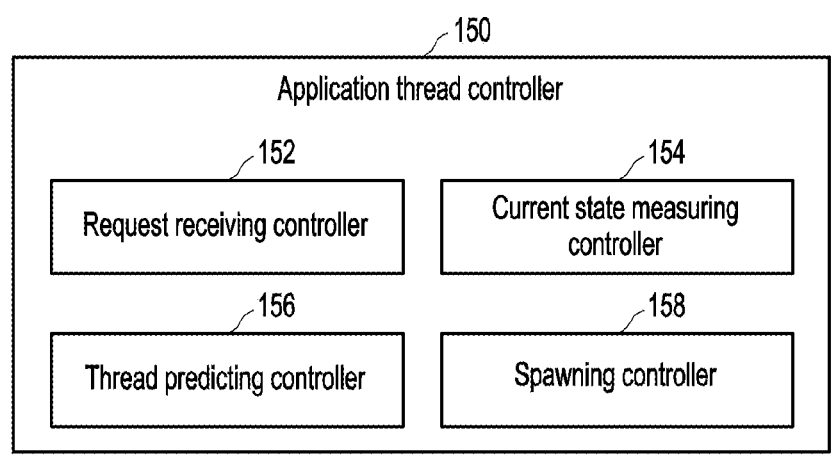
FIG. 3 illustrates a block diagram of an application thread controller, according to an embodiment as disclosed herein.

FIG. 3 illustrates a block diagram of the application thread controller 150, according to an embodiment as disclosed herein. In an embodiment, the application thread controller 150 includes a request receiving controller 152, a current state measuring controller 154, a thread predicting controller 156, and a spawning controller 158.

The request receiving controller 152 is configured to receive the request to predict the number of threads to be spawned from the application 110 in real-time. The current state measuring controller 154 is configured to measure the current state of the electronic device 100. Based on the scheduler-behaviour model and the current state of the electronic device 100, the thread predicting controller 156 is configured to predict the number of threads to be spawned for the application 110. After predicting the number of threads to be spawned for the application 110, the spawning controller 158 is configured to spawn the number of threads for the application 110.

In an embodiment, the thread predicting controller 156 is configured to determine the run-time for the plurality of scheduler-behaviour configurations for the current state of the electronic device 100. Further, the thread predicting controller 156 is configured to determine the scheduler-behaviour configuration from the plurality of scheduler-behaviour configurations that takes a minimum run-time for the current state of the electronic device 100. Further, the thread predicting controller 156 is configured to predict the number of threads to be spawned for the application 110 by selecting the thread count corresponding to the scheduler-behaviour configuration that takes the minimum run-time for the current state of the electronic device 100.

Although the FIG. 3 shows various hardware components of the application thread controller 150 but it is to be understood that other embodiments are not limited thereon. In other embodiments, the application thread controller 150 may include less or more number of components. Further, the labels or names of the components are used only for illustrative purpose and does not limit the scope of this disclosure. One or more components can be combined together to perform same or substantially similar function to control spawning of the threads for the application 110 embedded in the electronic device 100.

Figure 4:
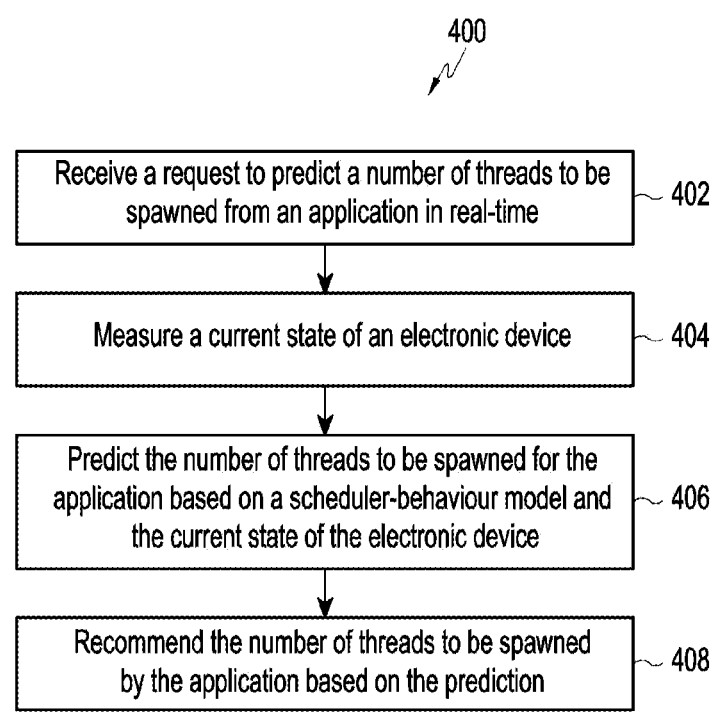
FIG. 4 illustrates a flow diagram of a method for recommending the number of threads for the application executed in the electronic device, according to an embodiment as disclosed herein.

FIG. 4 illustrates a flow diagram 400 of a method for recommending the number of threads for the application 110 executed in the electronic device 100, according to an embodiment as disclosed herein. At 402, the method includes receiving the request to predict the number of threads to be spawned from the application 110 in the real-time. In an embodiment, the method allows the request receiving controller 152 to receive the request to predict the number of threads to be spawned from the application 110 in the real-time.

At 404, the method includes measuring the current state of the electronic device 100. In an embodiment, the method allows the current state measuring controller 154 to measure the current state of the electronic device 100.

At 406, the method includes predicting the number of threads to be spawned for the application 110 based on the scheduler-behaviour model and the current state of the electronic device 100. In an embodiment, the method allows the thread predicting controller 156 to predict the number of threads to be spawned for the application 110 based on the scheduler-behaviour model and the current state of the electronic device 100.

At 408, the method includes recommending the number of threads to be spawned by the application 110. In an embodiment, the method allows the spawning controller 158 to recommend the number of threads to be spawned by the application 110.

The method can be used to dynamically decide the number of thread resources for particular system condition, so as to enhance optimum performance for the application 110. The method can be used to provide a consistent user experience during system error conditions (e.g., phone heating up, core fault or the like).

The various actions, acts, blocks, steps, or the like in the flow diagram 400 may be performed in the order presented, in a different order or simultaneously. Further, in some embodiments, some of the actions, acts, blocks, steps, or the like may be omitted, added, modified, skipped, or the like without departing from the scope of this disclosure.

Figure 5:
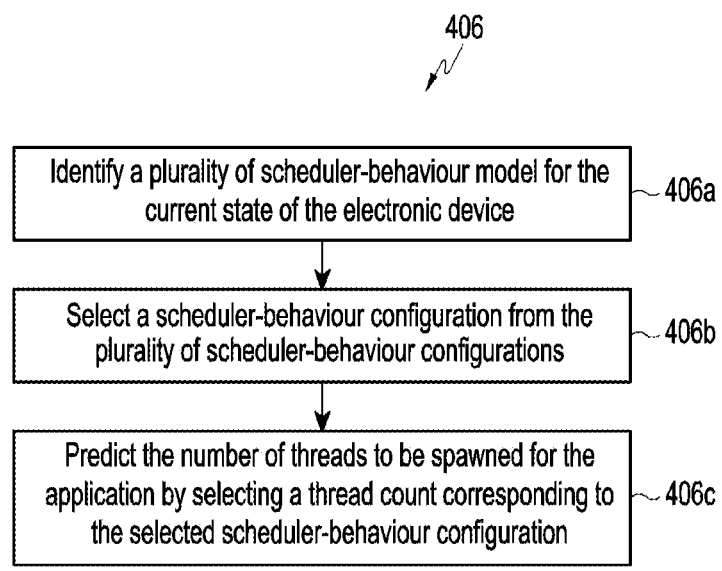
FIG. 5 illustrates a flow diagram of various operations for predicting a number of threads to be spawned for the application based on a scheduler-behaviour model and a current state of the electronic device, while recommending the number of threads for the application executed in the electronic device, according to an embodiment as disclosed herein.

FIG. 5 illustrates a flow diagram 406 of various operations for predicting the number of threads to be spawned for the application 110 based on the scheduler-behaviour model and the current state of the electronic device 100, while recommending the number of threads for the application 110 executed in the electronic device 100, according to an embodiment as disclosed herein. The operations (406a to 406c) are performed by the thread predicting controller 156.

At 406a, the method includes identifying the plurality of scheduler-behaviour configurations for the current state of the electronic device 100. At 406b, the method includes selecting the scheduler-behaviour configuration from the plurality of scheduler-behaviour configurations. The selected scheduler-behaviour configuration results in minimum run-time of the application for the current state of the electronic device 100. At 406c, the method includes predicting the number of threads to be spawned for the application 110 by selecting the thread count corresponding to the selected scheduler-behaviour configuration.

The various actions, acts, blocks, steps, or the like in the flow diagram 406 may be performed in the order presented, in a different order or simultaneously. Further, in some embodiments, some of the actions, acts, blocks, steps, or the like may be omitted, added, modified, skipped, or the like without departing from the scope of this disclosure.

Figure 6:
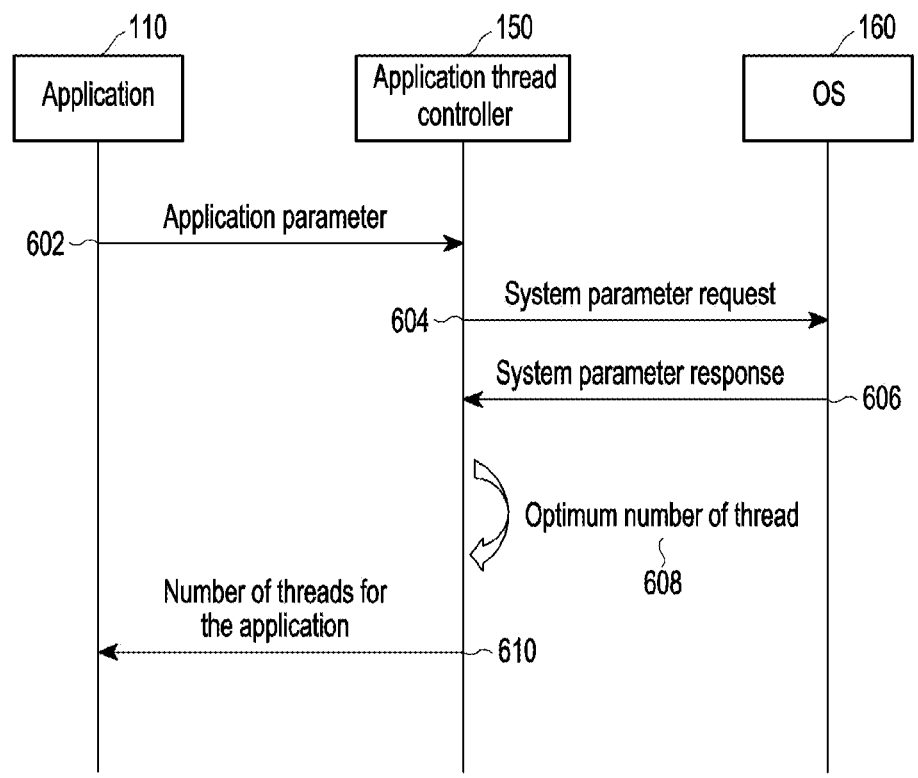
FIG. 6 illustrates an example sequence diagram of various operations for controlling spawning of threads for the application executed in the electronic device, according to an embodiment as disclosed herein.

FIG. 6 illustrates an example sequence diagram of various operations for controlling spawning of threads for the application 110 executed in the electronic device 100, according to an embodiment as disclosed herein. At 602, the application 110 sends an application parameter request to the application thread controller 150. The application parameter request corresponds to predict the number of threads to be spawned for the application 110. The application parameter request includes information such as a cycle per thread, a memory requirement per thread. At 604, the application thread controller 150 sends a system parameter request to the OS 170. At 606, based on the system parameter request, the OS 170 sends the system parameter response to the application thread controller 150. The system parameter response includes an information (e.g., CPU load, battery or the like). At 608, based on the system parameter response, the application thread controller 150 predicts the optimum number of thread. At 610, after predicting the optimum number of thread, the application 110 has to spawn the threads.

Figure 7A:
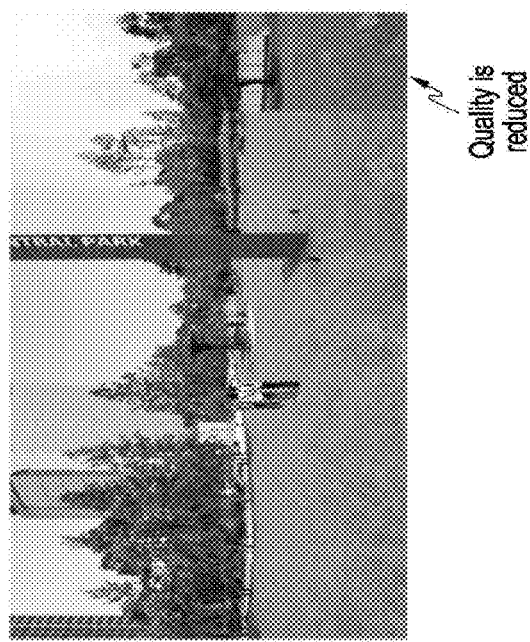
FIG. 7A illustrates an example in which a panorama image is generated by managing threads for a camera application, according to prior art.
Figure 7A:
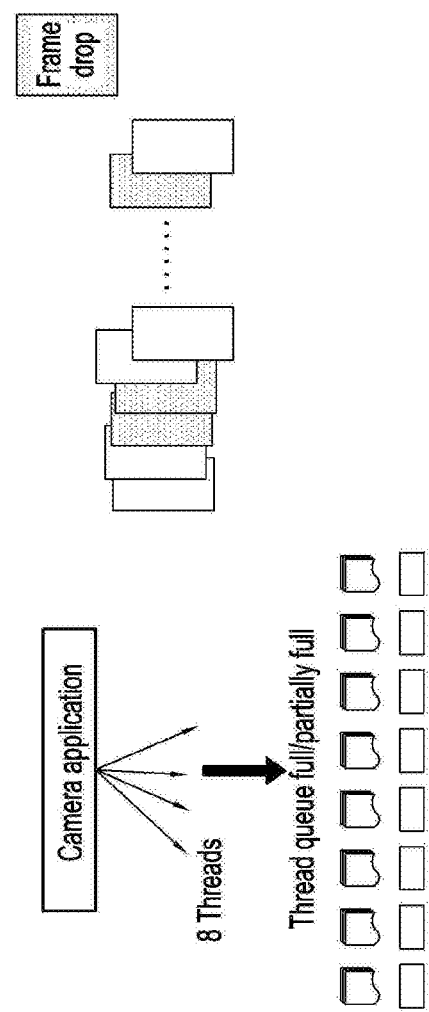

FIG. 7A illustrates an example in which a panorama image is generated by a camera application, according to prior art. In order to construct the panorama image, the camera application appends one frame to another frames and a primary requirement for stitching the frames for panorama image is real time for e.g. 30 fps. The camera application typically uses multiple threads to get high performance. But based on existing methods, as number of threads for the camera application is non-optimal in conditions such as high CPU load, low memory, the process for stitching the frames for panorama image runs at a slower rate, e.g., 15 fps. Hence significant frame drop is occurred, so that the panorama image quality is reduced.

Figure 7B:
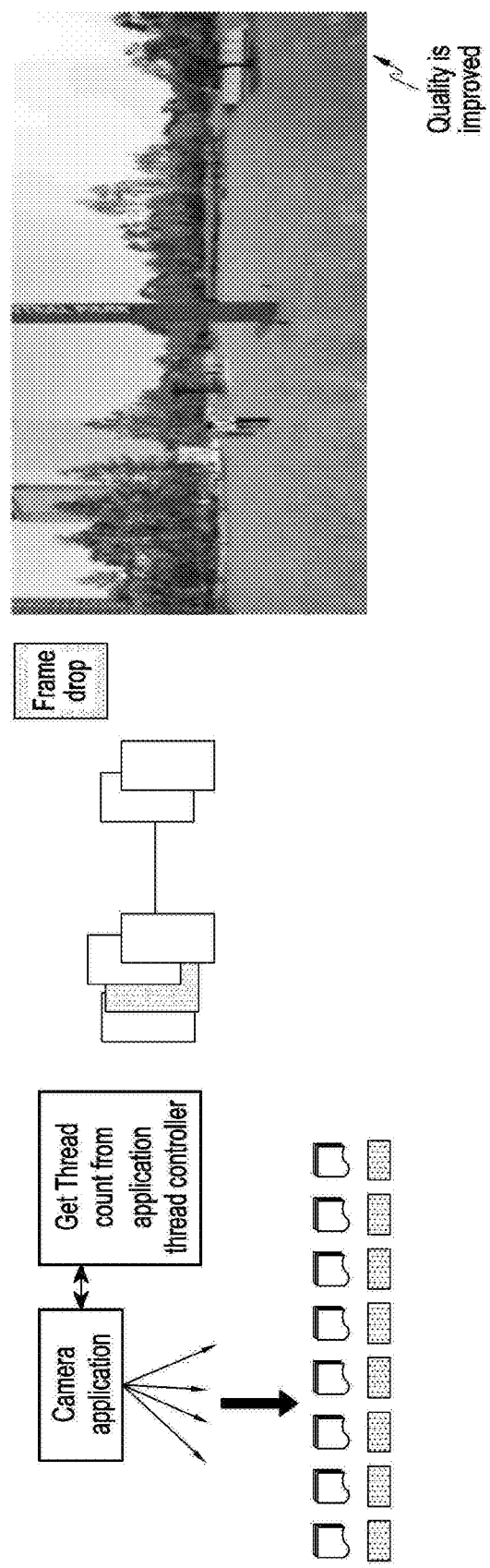
FIG. 7B illustrates an example in which a panorama quality enhancement is explained by controlling spawning of threads for the camera application while generating the panorama image, according to an embodiment as disclosed herein.

FIG. 7B illustrates an example in which a panorama quality enhancement is explained by controlling spawning of threads for the camera application while generating the panorama image, according to an embodiment as disclosed herein. In the proposed method, the application thread controller 150 receives the request to predict the number of threads to be spawned from the camera application. The application thread controller 150 measures the current state of the electronic device 100, such as the current CPU load, the current RAM usage and the number of active cores in the electronic device 100. Further, the application thread controller 150 predicts the number of threads to be spawned for the camera application based on the thread count requested, the current CPU load, the current RAM usage and the number of active cores in the electronic device 100, so that as number of threads for the optimal process for stitching the frames for the panorama image runs at an optimal run rate, e.g., 25 fps. Hence significant frame drop is avoided, so that the panorama image quality is improved.

Figure 8A:
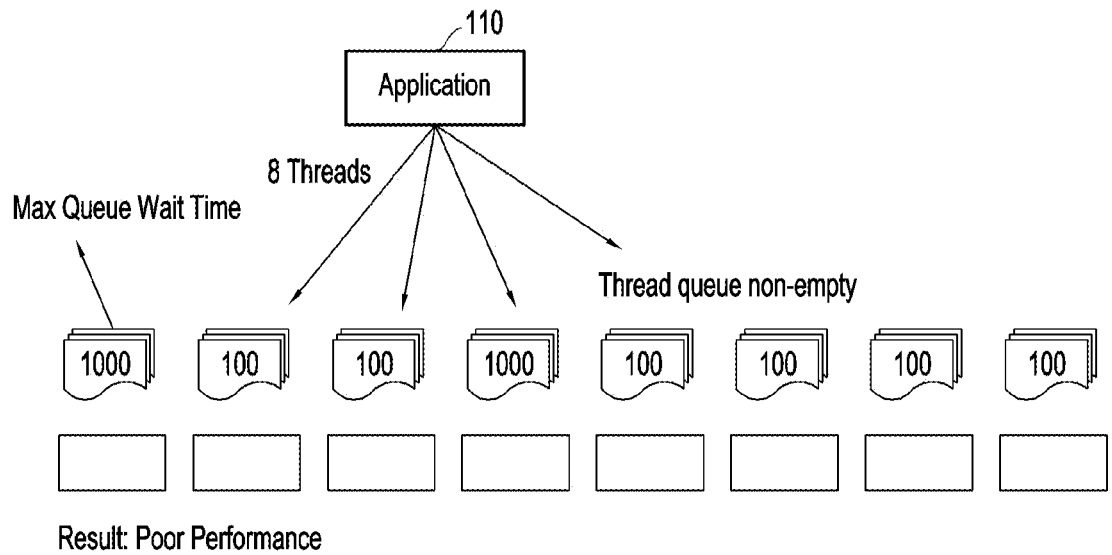
FIG. 8A illustrates an example in which launching of the application is explained when many tasks are running in background, such as after restarting the electronic device immediately, according to prior art.

FIG. 8A illustrates an example in which launching of the application 110 is explained when many tasks are running in a background, such as after restarting the electronic device 100 (e.g., smart phone) immediately, according to prior art. In existing methods, consider a scenario in which if multiple tasks are running in the background of the smart phone when the smart phone is restarted, then the smart phone launches the application in a very slow manner. In an example, the application 110 requests and obtains 8 threads for the launching the application, so that the process is divided into 8 parts to run on 8 cores, but since there are already multiple tasks running in the background, the application launch take more time.

Figure 8B:
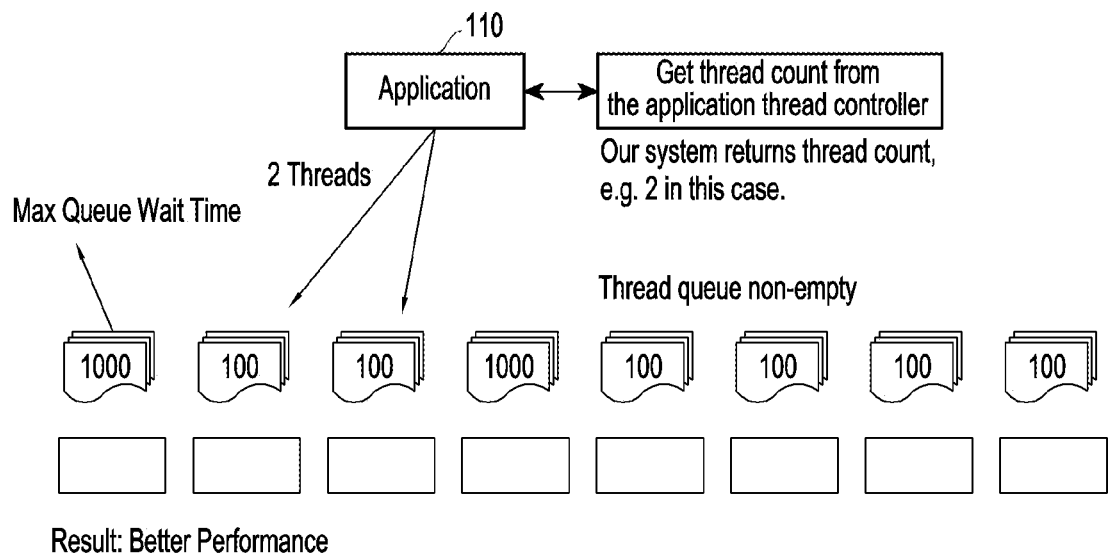
FIG. 8B illustrates an example in which launching of the application is explained when many tasks are running in the background, such as after restarting the electronic device immediately based on spawning of threads for the application, according to an embodiment as disclosed herein.

FIG. 8B illustrates an example in which launching of the application 110 is explained when many tasks are running in the background, such as after restarting the electronic device 100 (e.g., smart phone) immediately based on spawning of threads for the application 110, according to an embodiment as disclosed herein.

In the proposed method, the application thread controller 150 receives the request to predict the number of threads to be spawned for the application 110. Further, the application thread controller 150 measures at least one of the current CPU load, the current RAM usage and the number of active cores in the electronic device 100. Further, the application thread controller 150 predicts the number of threads to be spawned for the application 110 based on the thread count, and at least one of the current CPU load, the current RAM usage and the number of active cores in the electronic device 100, so that the application thread controller 150 suggests fewer threads (e.g., two threads), so that the process is divided into fewer parts which takes minimum time to launch the application. Based on the proposed method, the time taken to launch the application is equal to summation of maximum queue wait time and maximum of run-times of parts of the process. Based on the proposed method, the application 110 launches and work smoothly, quickly and immediately after the smart phone is restarted.

Figure 9A:
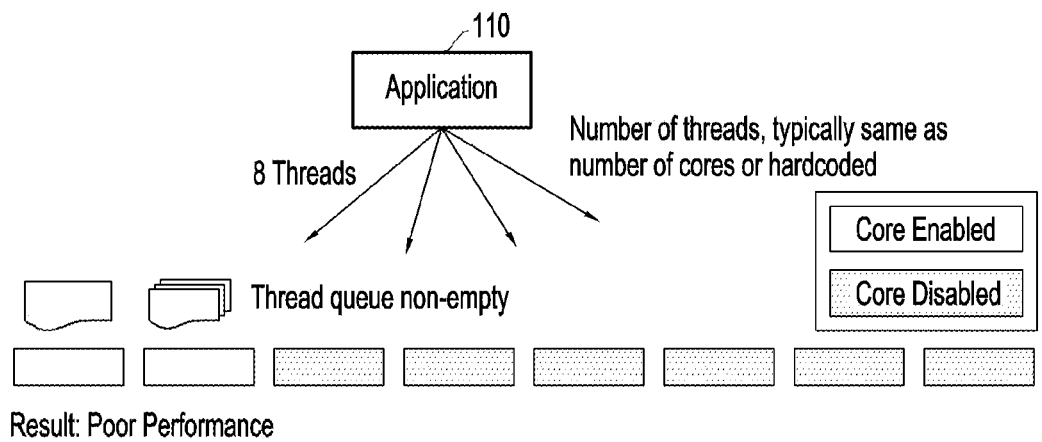
FIG. 9A illustrates an example in which a video playback application is operated when the electronic device is overheated, according to prior art.

FIG. 9A illustrates an example in which a video playback application is operated when the electronic device 100 (e.g., smart phone) is overheated, according to prior art. In existing methods, consider a scenario in which when the smart phone is getting overheated, few cores are disabled, so as to cause a video playback to stutter in the real time. In an example, the application requests and obtains 8 threads for the playing a video application, but the video application is running in only 2 cores due to the smart phone is getting overheated and some of the cores are inactive. The unavailability of cores (i.e., 6 cores) decreases the thread efficiency and increases overhead of the video application. This results in reducing the user experience.

Figure 9B:
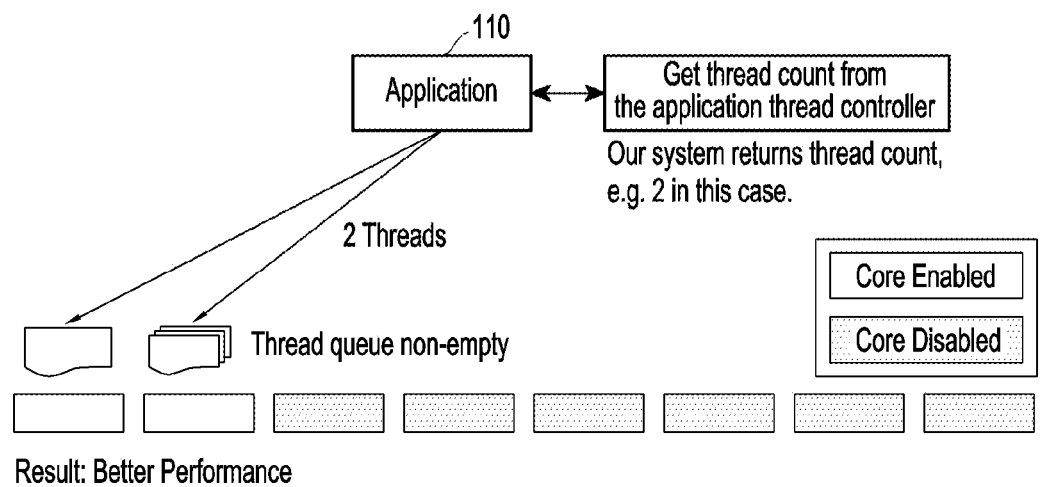
FIG. 9B illustrates an example in which a video playback application is operated based on spawning of threads for the video playback application when the electronic device is overheated, according to an embodiment as disclosed herein.

FIG. 9B illustrates an example in which the video playback application is operated based on spawning of threads for the video playback application when the electronic device 100 (e.g., smart phone) is overheated, according to an embodiment as disclosed herein.

In the proposed method, the application thread controller 150 receives the request to predict the number of threads to be spawned for the video application. Further, the application thread controller 150 measures at least one of the current CPU load, the current RAM usage and the number of active cores in the electronic device 100. Further, the application thread controller predicts the number of threads to be spawned for the video application based on the thread count, and the at least one of the current CPU load, the current RAM usage and the number of active cores in the electronic device 100, so that the application thread controller 150 suggests fewer threads (e.g., two threads), so that the process is divided into fewer parts. Thus, the method can be used to increase the thread efficiency and reduces overhead of the video application. Hence, a video playback works more smoothly even when the smart phone is over heated.

Figure 10A:
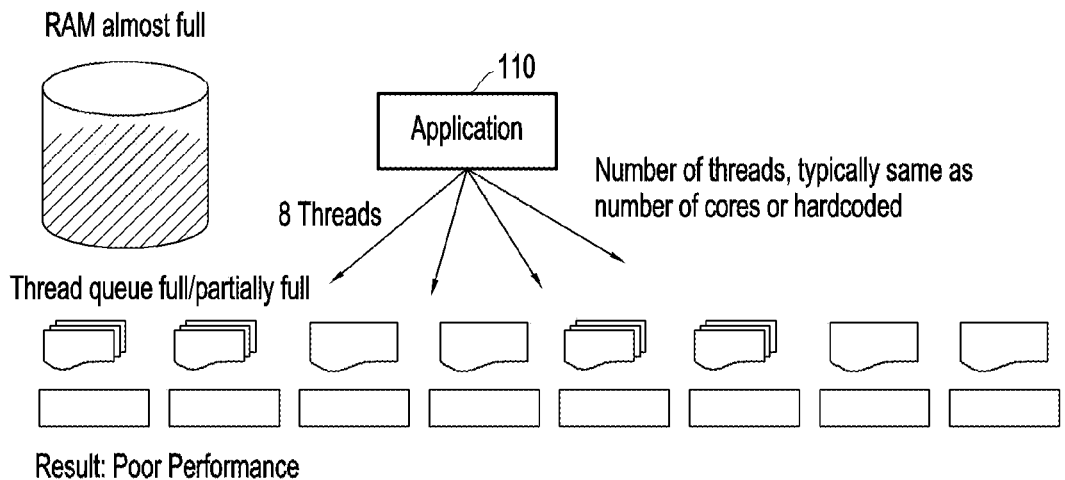
FIG. 10A illustrates an example in which a sluggishness of a memory is explained, according to prior art.

FIG. 10A illustrates an example in which a sluggishness of the memory 120 is explained, according to prior art. In existing methods, consider a scenario due to memory leaks RAM usage might be high which leads to sluggishness. In an example, the application requests and obtains 8 threads for the application 110, and parallel RAM access by the threads of the process slows down execution. This results in a poor performance of the electronic device 100.

Figure 10B:
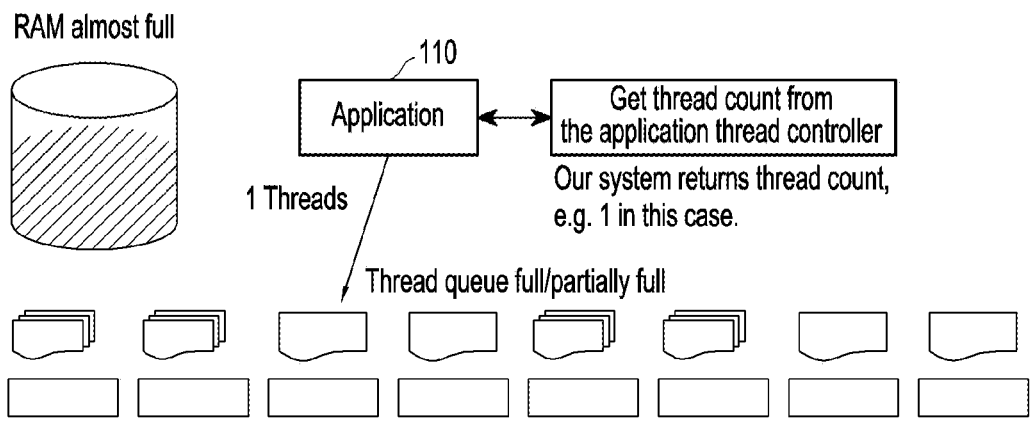
FIG. 10B illustrates an example in which the sluggishness of the memory is avoided based on spawning of threads for the application, according to an embodiment as disclosed herein.

FIG. 10B illustrates an example in which the sluggishness of the memory 120 is avoided based on spawning of threads for the application 110, according to an embodiment as disclosed herein. In the proposed method, the application thread controller 150 receives the request to predict the number of threads to be spawned for the application 110. Further, the application thread controller 150 measures at least one of the current CPU load, the current RAM usage and the number of active cores in the electronic device 100. Further, the application thread controller 150 predicts the number of threads to be spawned for the application based on the thread count, and the at least one the current CPU load, the current RAM usage and the number of active cores in the electronic device 100, so that the application thread controller 150 suggests fewer threads (e.g., one thread), so that the process is divided into fewer parts and demand for parallel RAM accesses for the application process is reduced, hence the device sluggishness is reduced.

Figure 11A:
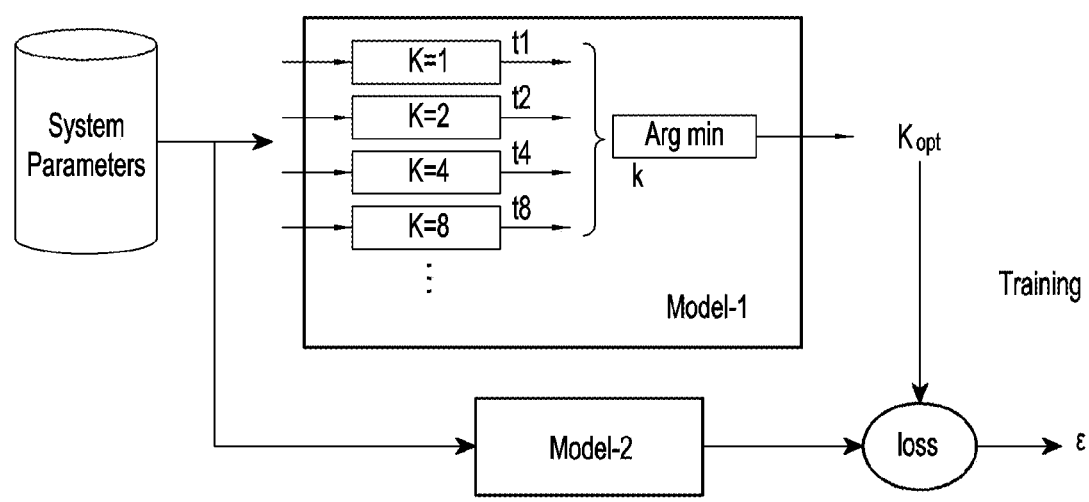
FIG. 11A and FIG. 11B illustrate an example in which various operations used to train a machine learning model that predicts an optimal number of threads to be spawned for the application, according to an embodiment as disclosed herein.
Figure 11B:
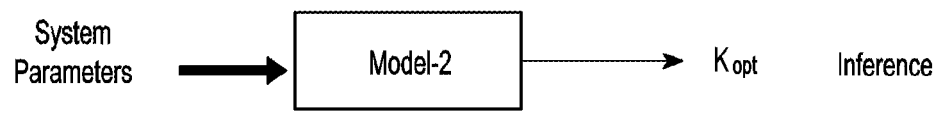

FIG. 11A and FIG. 11B illustrate an example illustration in which various operations used to train a machine learning model that predicts an optimal number of threads to be spawned for the application 110, according to an embodiment as disclosed herein.

As shown in the FIG. 11A, various operations are used to train a machine learning model that can predict the optimal number of threads to be spawned for the application 110 so that the run-time of the application 110 is minimized. The first step is to train a set of regression models, each capable of predicting the run-time taken by the application 110 for the given number of threads. The training data may be collected by running the application 110 several times on a hardware (e.g., Application thread controller 150) for different number of threads and for various system conditions including, but not limited to, memory usage, number of active cores, CPU load, etc. The time taken by the application 110 for each run may be recorded. Thereafter, the training data is partitioned into mutually exclusive subsets based on the number of threads used by the application 110. From each subset, the regression model is trained to predict the run-time of the application 110 for the corresponding number of threads. For a given system state, the optimal number of threads to be spawned is decided by using each regression model to predict the run-time for the application for each thread and then choosing the one that predicts minimum run-time. This entire model is named Model-1 in the FIG. 11A.

The FIG. 11B describes a Model-2 that can predict the number of threads to be spawned directly from the system state, without predicting the run-time for each thread and then taking the minimum. The Model-2 can be designed as a classifier that classifies the system state into one of the classes, where the classes are defined based on the optimal number of threads for the given system state. To train such a classifier, it is required to label the training data by the optimal thread for each training sample. As shown in FIG. 11A, the Model-1 is used for labelling the training data. The Model-1 essentially predicts the optimal number of threads for each training/test sample and the predicted optimal number of thread is used to label the training/test data. The classifiers such as support vector machine (SVM), neural networks and decision trees can be used for the Model-2.

The embodiments disclosed herein can be implemented using at least one software program running on at least one hardware device and performing network management functions to control the elements.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for predicting an optimal number of threads for an application in an electronic device, comprising:
   receiving, by an application thread controller of the electronic device from the application, a request to determine a first number of threads to be spawned for the application, wherein the request comprises information on cycles per thread and a memory requirement per thread;
   in response to receiving the request from the application, obtaining, by the application thread controller, a current state of the electronic device including a current battery condition of the electronic device;
   determining, by the application thread controller, the first number of threads to be spawned so that a run-time for the application is minimized based on a scheduler-behavior model and the current state of the electronic device including the current battery condition of the electronic device; and
   recommending, by the application thread controller, the determined first number of threads to be spawned for the application, to the application,
   wherein the scheduler-behavior model comprises a first model for predicting the run-time for the application and a second model for predicting a second number of threads to be spawned for the application without predicting the run-time,
   wherein the first model comprises a plurality of regression models, each of the plurality of regression models being for predicting the run-time for a given number of threads, and a number of threads corresponding to a regression model among the plurality of regression models which predicts a minimum run-time is determined as the optimal number of threads for the application, and
   wherein the second model comprises a classifier for classifying the current state of the electronic device into at least one of classes.

2. The method of claim 1, wherein the current state of the electronic device further comprises at least one of a current CPU load, a current RAM usage, a current temperature, a current memory status, and a number of active cores in the electronic device.

3. The method of claim 1, wherein the scheduler-behavior model includes a plurality of scheduler-behavior configurations corresponding to at least one of: one or more device states, a run-time of the application corresponding to the plurality of scheduler-behavior configurations, and a thread count spawned corresponding to the plurality of scheduler-behavior configurations.

4. The method of claim 1, wherein determining by the application thread controller of the first number of threads to be spawned for the application based on the scheduler-behavior model and the current state of the electronic device comprises:
   identifying a plurality of scheduler-behavior configurations for the current state of the electronic device;
   selecting a scheduler-behavior configuration from the plurality of scheduler-behavior configurations, wherein the selected scheduler-behavior configuration results in the minimum run-time of the application for the current state of the electronic device; and
   determining the first number of threads to be spawned for the application by selecting a thread count corresponding to the selected scheduler-behavior configuration.

5. The method of claim 4, wherein the plurality of scheduler-behavior configurations is dynamically learned by the application thread controller for various states of the electronic device, and
   wherein each scheduler-behavior configuration indicates a state of the electronic device, a time taken by the application at the state of the electronic device, and a thread count spawned at the state of the electronic device.

6. The method of claim 1, further comprising:
   training a machine learning model, including:
      partitioning training data into mutually exclusive subsets based on a first number of threads used by the application, and
      training each of the plurality of regression models to predict a run-time for the application for each thread.

7. The method of claim 6, wherein the training data includes at least one of memory usage, number of active cores, or CPU load.

8. An electronic device for predicting an optimal number of threads for an application, comprising:
   a memory storing the application;
   a processor; and
   an application thread controller coupled to the memory and the processor, wherein the application thread controller is configured to:

receive, from the application, a request to determine a first number of threads to be spawned for the application, wherein the request comprises information on cycles per thread and memory requirement per thread, in response to receiving the request from the application, obtain a current state of the electronic device including a current battery condition of the electronic device, determine the first number of threads to be spawned so that a run-time for the application is minimized based on a scheduler-behavior model and the current state of the electronic device including the current battery condition of the electronic device, and recommend the determined first number of threads to be spawned for the application, to the application, wherein the scheduler-behavior model comprises a first model for predicting the run-time for the application and a second model for predicting a second number of threads to be spawned for the application without predicting the run-time, wherein the first model comprises a plurality of regression models, each of the plurality of regression models being for predicting the run-time for a given number of threads, and a number of threads corresponding to a regression model among the plurality of regression models which predicts a minimum run-time is determined as the optimal number of threads for the application, and wherein the second model comprises a classifier for classifying the current state of the electronic device into at least one of classes.

9. The electronic device of claim 8, wherein the current state of the electronic device further comprises at least one of: a current CPU load, a current RAM usage, a current temperature, a current memory status, and a number of active cores in the electronic device.

10. The electronic device of claim 8, wherein the scheduler-behavior model includes a plurality of scheduler-behavior configurations corresponding to at least one of: one or more device states, a run-time of the application corresponding to the plurality of scheduler-behavior configurations, and a thread count spawned corresponding to the plurality of scheduler-behavior configurations.

11. The electronic device of claim 8, wherein the application thread controller is configured to determine the first number of threads to be spawned for the application based on the scheduler-behavior model and the current state of the electronic device by:

identifying a plurality of scheduler-behavior configurations for the current state of the electronic device;

selecting a scheduler-behavior configuration from the plurality of scheduler-behavior configurations, wherein the selected scheduler-behavior configuration results in the minimum run-time of the application for the current state of the electronic device; and determining the first number of threads to be spawned for the application by selecting a thread count corresponding to the selected scheduler-behavior configuration.

12. The electronic device of claim 11, wherein the plurality of scheduler-behavior configurations is dynamically learned by the application thread controller for various states of the electronic device, and wherein each scheduler-behavior configuration indicates a state of the electronic device, time taken by the application at the state of the electronic device, and a thread count spawned at the state of the electronic device.

13. The electronic device of claim 8, wherein the application thread controller is further configured to:

train a machine learning model, including:

partition training data into mutually exclusive subsets based on a number of threads used by the application, and train each of the plurality of regression models to predict a run-time for the application for each thread.

14. The electronic device of claim 13, wherein the training data includes at least one of memory usage, number of active cores, or CPU load.

15. A non-transitory computer readable medium embodying a computer program for operating an electronic device including a processor, the computer program comprising computer readable program code that, when executed by the processor, causes an application thread controller of the electronic device to:

receive, from an application, a request to determine a first number of threads to be spawned for the application, wherein the request comprises information on cycles per thread and a memory requirement per thread;

in response to receiving the request from the application, obtain a current state of the electronic device in response to the request received from the application including a current battery condition of the electronic device;

determine the first number of threads to be spawned so that a run-time for the application is minimized based on a scheduler-behavior model and the current state of the electronic device including the current battery condition of the electronic device; and recommend the determined first number of threads to be spawned for the application, to the application, wherein the scheduler-behavior model comprises a first model for predicting the run-time for the application and a second model for predicting a second number of threads to be spawned for the application without predicting the run-time, wherein the first model comprises a plurality of regression models, each of the plurality of regression models being for predicting the run-time for a given number of threads, and a number of threads corresponding to a regression model among the plurality of regression models which predicts a minimum run-time is determined as an optimal number of threads for the application, and wherein the second model comprises a classifier for classifying the current state of the electronic device into at least one of classes.

16. The non-transitory computer readable medium of claim 15, wherein the current state of the electronic device further comprises at least one of: a current CPU load, a current RAM usage, a current temperature, a current memory status, and a number of active cores in the electronic device.

17. The non-transitory computer readable medium of claim 15, wherein the scheduler-behavior model includes a plurality of scheduler-behavior configurations corresponding to at least one of: one or more device states, a run-time of the application corresponding to the plurality of scheduler-behavior configurations, and a thread count spawned corresponding to the plurality of scheduler-behavior configurations.

18. The non-transitory computer readable medium of claim 15, wherein to predict the first number of threads to be spawned for the application based on the scheduler-behavior model and the current state of the electronic device, the computer readable program code, when executed by the processor, causes the application thread controller to:
- identify a plurality of scheduler-behavior configurations for the current state of the electronic device;
- select a scheduler-behavior configuration from the plurality of scheduler-behavior configurations, wherein the selected scheduler-behavior configuration results in the minimum run-time of the application for the current state of the electronic device; and
- determine the first number of threads to be spawned for the application by selecting a thread count corresponding to the selected scheduler-behavior configuration.

19. The non-transitory computer readable medium of claim 18, wherein the plurality of scheduler-behavior configurations is dynamically learned for various states of the electronic device, and
- wherein each scheduler-behavior configuration indicates a state of the electronic device, a time taken by the application at the state of the electronic device, and a thread count spawned at the state of the electronic device.

20. The non-transitory computer readable medium of claim 15, wherein the computer program further comprises computer readable program code that, when executed by the processor, causes the application thread controller to:
- train a machine learning model, including:
  - partition training data into mutually exclusive subsets based on a number of threads used by the application, and
  - train each of the plurality of regression models to predict a run-time for the application for each thread.

* * * * *